(12) United States Patent
Willi et al.

(10) Patent No.: US 7,343,905 B2
(45) Date of Patent: Mar. 18, 2008

(54) SYSTEM AND METHOD FOR CONDITIONING FUEL

(75) Inventors: Martin L. Willi, Dunlap, IL (US); Darryl D. Baldwin, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 39 days.

(21) Appl. No.: 11/393,954

(22) Filed: Mar. 31, 2006

(65) Prior Publication Data

US 2007/0234715 A1    Oct. 11, 2007

(51) Int. Cl.
*F01N 5/02* (2006.01)
*F02B 43/00* (2006.01)
*F02M 15/00* (2006.01)

(52) U.S. Cl. ............................. 123/527; 123/541; 123/3

(58) Field of Classification Search ................ 123/1 A, 123/2–3, 27 GE, 525–527, 541
See application file for complete search history.

(56) References Cited

U.S. PATENT DOCUMENTS

| | | | |
|---|---|---|---|
| 2,411,347 A | | 11/1946 | Trumpler |
| 3,855,980 A | * | 12/1974 | Weisz et al. .................... 123/3 |
| 4,155,337 A | * | 5/1979 | Hensley ........................ 123/541 |
| 4,216,751 A | * | 8/1980 | Davison et al. .............. 123/523 |
| 4,370,150 A | | 1/1983 | Fenstermaker |
| 4,505,124 A | * | 3/1985 | Mayer .......................... 62/180 |
| 4,745,768 A | | 5/1988 | Schorr et al. |
| 4,862,836 A | * | 9/1989 | Chen et al. ..................... 123/3 |
| 4,938,036 A | * | 7/1990 | Hodgkins et al. ........... 62/323.1 |
| 5,081,977 A | * | 1/1992 | Swenson ...................... 123/527 |
| 5,251,603 A | * | 10/1993 | Watanabe et al. ............ 123/541 |
| 5,375,580 A | * | 12/1994 | Stolz et al. .................. 123/527 |
| 5,390,646 A | * | 2/1995 | Swenson ...................... 123/525 |
| 5,548,971 A | | 8/1996 | Rockenfeller et al. |
| 5,549,096 A | * | 8/1996 | Swenson et al. ............. 123/564 |
| 6,050,083 A | | 4/2000 | Meckler |
| 6,158,241 A | | 12/2000 | Erickson |
| 6,360,730 B1 | * | 3/2002 | Koethe ........................ 123/541 |
| 6,543,531 B1 | | 4/2003 | Cäsar et al. |
| 6,640,790 B2 | | 11/2003 | Katayama et al. |
| 6,651,443 B1 | | 11/2003 | Meckler |
| 6,735,963 B2 | | 5/2004 | Sarkisian et al. |
| 6,792,898 B2 | | 9/2004 | Banzhaf et al. |
| 6,843,064 B2 | | 1/2005 | Khalili et al. |
| 6,843,312 B2 | | 1/2005 | Burk et al. |
| 6,910,345 B2 | | 6/2005 | Horstmann et al. |
| 7,210,467 B2 | * | 5/2007 | Kweon et al. ............... 123/557 |
| 7,222,821 B2 | * | 5/2007 | Matos et al. ............. 244/135 R |
| 2005/0188711 A1 | | 9/2005 | Wang et al. |

FOREIGN PATENT DOCUMENTS

| | | |
|---|---|---|
| JP | 9088741 | 3/1997 |
| JP | 9088742 | 3/1997 |
| WO | WO 94/19512 | 9/1994 |

* cited by examiner

*Primary Examiner*—Hai Huynh
(74) *Attorney, Agent, or Firm*—Finnegan, Henderson, Farabow, Garrett & Dunner

(57) ABSTRACT

An engine assembly may include an internal combustion engine configured to combust a gaseous fuel. The engine assembly may also include a fuel intake line operatively connected to the internal combustion engine. The fuel intake line may be configured to direct the gaseous fuel towards the internal combustion engine. The engine assembly may further include a refrigeration assembly operatively connected to the fuel intake line. The refrigeration assembly may be configured to cool the gaseous fuel in the fuel intake line.

20 Claims, 2 Drawing Sheets

SYSTEM AND METHOD FOR CONDITIONING FUEL

TECHNICAL FIELD

The present disclosure relates generally to conditioning fuel, and more particularly to a system and method for conditioning fuel.

BACKGROUND

A gas pipeline system may include one or more wellheads, pipelines, and compressor stations. Underground reservoirs or wells of natural gas may be brought to surface level by the wellhead. The natural gas may be transmitted along the pipeline to other locations, often times over great distances. The natural gas in the pipeline may be pressurized by the compressor station. By pressurizing the natural gas, the compressor station may provide a propellant force to push the natural gas through the pipeline. The compressor station may be one of many located at predetermined distances on the pipeline that may help maintain gas pressure within the pipeline and facilitate movement of the natural gas therethrough. The compressor station may include a gas compressor that may be powered by an internal combustion engine. Fuel for operating the internal combustion engine may include methane in natural gas diverted from the pipeline into the internal combustion engine.

Hydrocarbons other than methane may also be found in the natural gas in the pipeline, and these hydrocarbons may be detrimental to the performance of the internal combustion engine. At least one system has been developed to upgrade a raw natural gas stream from a pipeline to remove unwanted hydrocarbons. For example, U.S. Pat. No. 4,370,150 to Fenstermaker ("Fenstermaker"), discloses a gas compressor operated by a gas engine. Fuel for the gas engine comes from raw field gas in a pipeline. A membrane separator such as, for example, a silicone membrane, is used to separate unwanted hydrocarbons from the raw field gas, to upgrade the raw field gas before it enters the gas engine. However, the membrane separator may hinder the flow of fuel to the gas engine, and thus, may negatively affect its performance. Furthermore, the membrane separator may become damaged or clogged during use, requiring downtime for the gas compressor and/or gas engine to fix or replace the membrane separator.

The system of the present disclosure is directed towards overcoming one or more of the constraints set forth above.

SUMMARY OF THE INVENTION

In one aspect, the presently disclosed embodiments may be directed to an engine assembly. The engine assembly may include an internal combustion engine configured to combust a gaseous fuel. The engine assembly may also include a fuel intake line operatively connected to the internal combustion engine. The fuel intake line may be configured to direct the gaseous fuel towards the internal combustion engine. The engine assembly may further include a refrigeration assembly operatively connected to the fuel intake line. The refrigeration assembly may be configured to cool the gaseous fuel in the fuel intake line.

In another aspect, the presently disclosed embodiments may be directed to a method for improving engine performance. The method may include diverting a gaseous fuel from a pipeline into a fuel intake line of an engine. The method may also include cooling the gaseous fuel in the fuel intake line to form condensation, and separating the condensation from the gaseous fuel. The method may further include supplying the gaseous fuel to the engine for combustion.

In yet another aspect, the presently disclosed embodiments may be directed to a fuel conditioning system. The system may include a refrigeration assembly operatively connected to a fuel intake line of an internal combustion engine. The refrigeration assembly may be configured to cool a gaseous fuel flowing through the fuel intake line. The system may also include a separator operatively connected to at least one of the refrigeration assembly and the fuel intake line. The separator may be configured to separate the gaseous fuel from condensation formed by cooling the gaseous fuel.

DETAILED DESCRIPTION

Exemplary embodiments of the present disclosure are illustrated in the accompanying drawings. Wherever possible, the same reference numbers will be used throughout the drawings to refer to the same or like parts.

Figure 1:
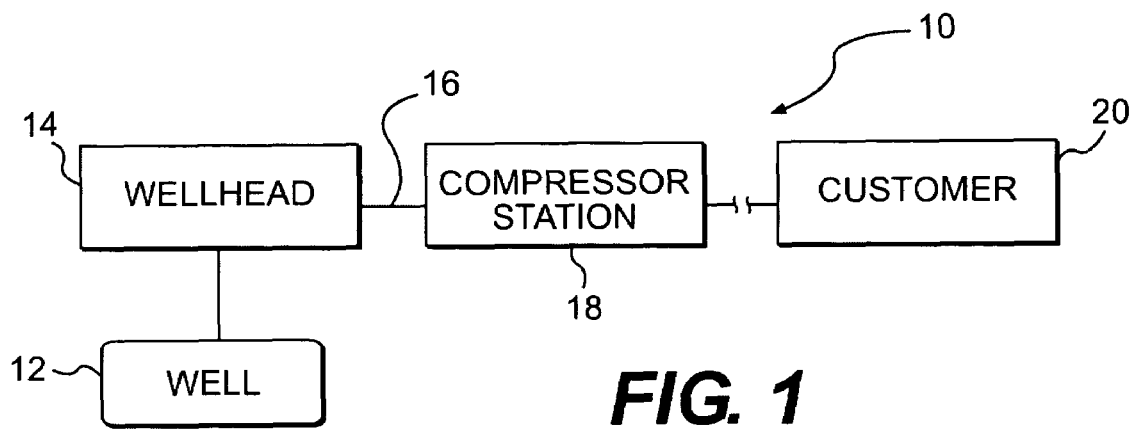
FIG. 1 is a block diagram of a pipeline system according to an exemplary embodiment of the present disclosure.
Figure 2:
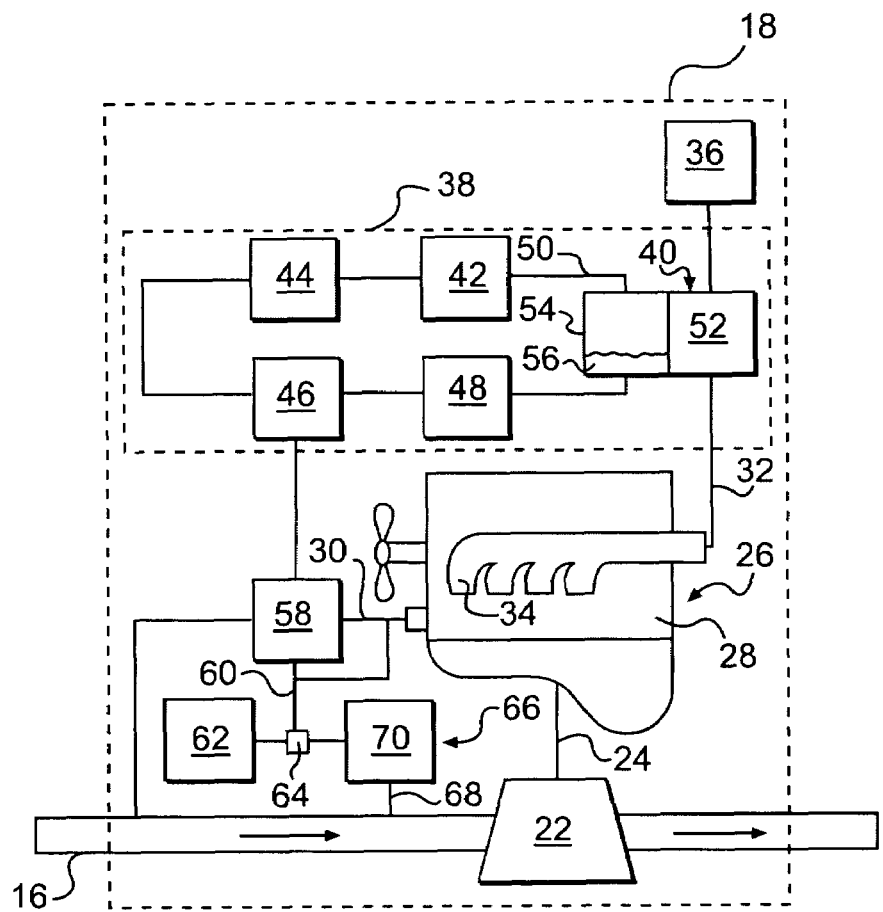
FIG. 2 is a diagrammatic illustration of a compressor station according to an exemplary embodiment of the present disclosure.

As shown in FIG. 1, a gas pipeline system 10 may include a well 12, a wellhead 14, a pipeline 16, and a compressor station 18, and may direct gas towards one or more customers 20. Compressor station 18 is shown in greater detail in FIG. 2. Compressor station 18 may include a gas compressor 22 having one or more pistons (not shown) operatively coupled to a crankshaft 24 by one or more connecting rods (not shown). Rotation of crankshaft 24 may cause the pistons to move so as to pressurize the natural gas flowing through gas compressor 22 by reducing its volume. The pressurized natural gas may help push the natural gas downstream from compressor station 18 through pipeline 16 to facilitate movement of the natural gas therein. It is contemplated that gas compressor 22 may include a rotary screw compressor, a centrifugal compressor, and or any other suitable compressor known in the art.

The power to rotate crankshaft 24 may be supplied by an engine 26. Engine 26 may include, for example, an internal combustion engine, having an engine block 28 that may define one or more cylinders (not shown). One or more pistons (not shown) may be disposed within the cylinders for sliding movement therein. By way of its sliding movement, each piston may draw air, fuel, or a combination thereof, into its respective cylinder and compress the air and fuel to facilitate combustion of the fuel. Crankshaft 24 may be rotatably disposed within engine block 28. A connecting rod (not shown) may connect each of the pistons to crankshaft 24 so that a sliding motion of each piston within its respective cylinder, caused by combustion of the fuel in the cylinder, may result in a rotation of crankshaft 24 and compression of the natural gas in gas compressor 22. One skilled in the art will recognize that engine 26 may include four, six, eight, or a greater or lesser number of pistons, and that the pistons may be disposed in an "in-line" configuration, a "V" configuration, or any other suitable configuration.

Engine 26 may include a fuel intake line 30. Fuel intake line 30 may receive fuel from a fuel supply, and may direct the fuel into the cylinders. In one embodiment, fuel intake line 30 may include a passage fluidly connecting the cylinders of engine 26 to pipeline 16. At least a portion of a flow of natural gas in pipeline 16 may be diverted into fuel intake line 30, and the rate of the flow of diverted natural gas may be selectively controlled by any suitable valve device (not shown) located along fuel intake line 30. The natural gas entering fuel intake line 30 may enter the cylinders and may be combusted therein to drive the pistons in engine 26, thus powering engine 26 and gas compressor 22. In one embodiment, engine 26 may be mainly powered by the combustion of methane. However, the unprocessed natural gas supplied by pipeline 16 may contain gaseous impurities, such as, for example, ethane, propane, butane, and other heavy hydrocarbons. While engine 26 may be capable of combusting the unprocessed natural gas, engine performance and efficiency may be improved by treating the unprocessed natural gas to remove the impurities within it before it is combusted in the cylinders of engine 26.

The exhaust generated by combustion of the natural gas may be evacuated from within the combustion chambers through an exhaust line 32 coupled to the cylinders by one or more exhaust conduits 34. The exhaust may be directed towards an aftertreatment system 36 that may be configured to clean the exhaust. Cleaning may be accomplished by, for example, passing the exhaust through a particulate filter and/or over a catalyst. Once the exhaust stream has undergone treatment, it may be expelled into the environment and/or recirculated back into engine 26 to assist in subsequent combustion processes.

Compressor station 18 may also include a refrigeration assembly, such as, for example, an absorption chiller assembly 38. Absorption chiller assembly 38 may be operatively connected to exhaust line 32 and/or fuel intake line 30. Absorption chiller assembly 38 may be configured to chill fuel intake line 30 and the natural gas flowing through fuel intake line 30. As the natural gas is chilled, its temperature decreases, which may cause heavy hydrocarbons in the natural gas to condense. After condensing, the heavy hydrocarbons may be separated from the gaseous portions of the natural gas supplied to the cylinders of engine 26. This process of separating out the heavy hydrocarbons from the natural gas conditions the natural gas, and may help to ensure that a higher quality supply of natural gas is combusted in the cylinders of engine 26. Use of conditioned natural gas may enhance engine performance. In one embodiment, absorption chiller assembly may include a generator 40, a separation apparatus 42, a condenser 44, an evaporator 46, an absorber 48, and one or more flow conduits 50 placing these elements in fluid communication with each other. Further descriptions of these elements are provided below.

Generator 40 may include a heat source 52 operatively connected to a vessel 54, and may be configured to house a refrigerant 56. In one embodiment, refrigerant 56 may include a mixture of ammonia and water. Heat source 52 may supply heat to vessel 54, and in doing so, may cause the ammonia in refrigerant 56 to vaporize into ammonia gas. The ammonia gas may exit from vessel 54 and may flow through separation apparatus 42. Separation apparatus 42 may remove the ammonia gas from the water, and the separated ammonia gas may then be directed towards condenser 44.

As the ammonia gas travels through condenser 44, the gas may come into contact with the walls of condenser 44. Heat may be transferred from the ammonia gas to the walls, and then from the walls into the environment, thus removing heat from the ammonia gas. The removal of heat from the ammonia gas in condenser 44 may cause the ammonia gas to condense into liquid ammonia.

The liquid ammonia may flow into evaporator 46, where it may undergo evaporation. Because evaporation is an endothermic reaction, an evaporating liquid may absorb heat as it evaporates. Thus, evaporation of the liquid ammonia may absorb heat from evaporator 46, which may in turn absorb heat from its surroundings. Evaporator 46 may be operatively connected to a refrigeration unit 58, and may draw heat from within refrigeration unit 58 to make the refrigeration unit cold. Refrigeration unit 58 may cool fuel intake line 30 to chill the natural gas contained therein.

The ammonia gas may flow through flow conduit 50 into absorber 48, where the ammonia gas may be re-absorbed by water, thus re-forming the mixture of water and ammonia that may flow back to vessel 54. The refrigeration cycle described above may repeat itself as long as heat source 52 supplies the necessary heat energy to drive the aforementioned reactions. It is also contemplated that a circulation pump (not shown), may be operatively connected to absorption chiller assembly 38 to help drive the fluids during the refrigeration cycle.

In another embodiment refrigerant 56 may include a mixture of ammonia, hydrogen, and water. In such an embodiment, evaporator 46 may also receive a flow of hydrogen gas. As the hydrogen gas passes across the surface of the liquid ammonia in evaporator 46, the hydrogen gas may assist in bringing about evaporation of the liquid ammonia into ammonia gas. The evaporation of the liquid ammonia may extract heat from evaporator 46. This refrigeration cycle may repeat continuously so long as heat source 52 continues to provide heat to vessel 54. It should be understood that the description of absorption chiller assembly 38 provided above is for exemplary purposes only. One skilled in the art would recognize that absorption chiller assembly 38 may include more or less components, and may include any suitable absorption chiller assembly known in the art.

Heat source 52 may be operatively connected to at least a portion of exhaust line 32. Exhaust line 32 may circulate at least a portion of the flow of exhaust gas produced by engine 26 towards generator 40. As the exhaust gas flows through heat source 52, heat from the exhaust gas may transfer to heat source 52, and then to vessel 54.

As absorption chiller assembly 38 cools the unprocessed natural gas entering fuel intake line 30, heavy hydrocarbons contained in the unprocessed natural gas may condense. The condensed heavy hydrocarbons may flow from refrigeration unit 58 and/or fuel intake line 30 into a separator, including, for example, one or more flow conduits 60, to separate the condensation from the rest of the natural gas. The condensed heavy hydrocarbons may be directed through flow conduits 60 into a storage apparatus 62. Storage apparatus 62 may include one or more containers or barrels (not shown) that may store the condensed hydrocarbons for later use and/or resale. The flow of condensed hydrocarbons into storage apparatus 62 may be selectively controlled by a valve device 64. It is contemplated that the condensed hydrocarbons may flow into storage apparatus 62 due to the effects of gravity and/or by use of a pump (not shown) that may pump the condensed hydrocarbons into storage apparatus 62.

Additionally or alternatively, at least a portion of the flow of condensed hydrocarbons may be directed, using valve device 64, back into pipeline 16 through a mixing apparatus 66. Mixing apparatus 66 may include, for example, a mixing line 68 and a pump 70. Mixing line 68 may allow the condensed hydrocarbons to flow into pipeline 16 at a point downstream from where pipeline 16 meets with fuel intake line 30. In operation, pump 70 may force the condensed hydrocarbons back into the flow of unprocessed natural gas in pipeline 16, where it may evaporate or otherwise mix with the flow. Mixing of the condensed hydrocarbons with the flow of unprocessed natural gas may be assisted by using a spray nozzle, atomizer, and/or any other mechanism (not shown) for injecting a fluid into a gaseous flow. Further, the mechanism may be mounted within pipeline 16 at its junction with mixing line 68.

Figure 3:
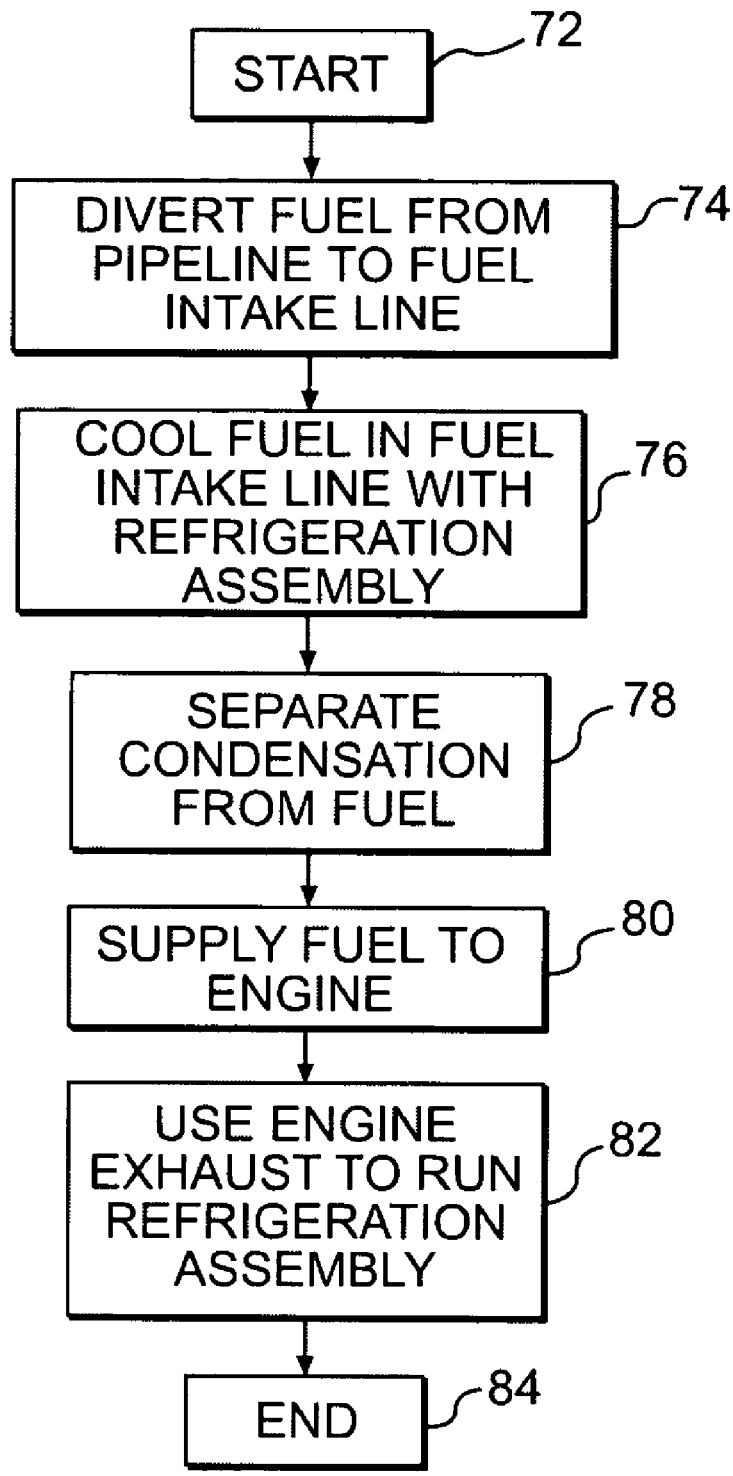
FIG. 3 is a flow diagram showing a method of conditioning fuel according to an exemplary embodiment of the present disclosure.

One exemplary method of conditioning fuel is shown in FIG. 3. Operation of compressor station 18 may start (step 72) by diverting gaseous fuel, such as, for example, natural gas, from pipeline 16 into fuel intake line 30 of engine 26 (step 74). In fuel intake line 30, the gaseous fuel may be cooled (step 76) by a refrigeration assembly 38, and condensation may form. The condensation, which may include heavy hydrocarbons, may be separated from the rest of the gaseous fuel (step 78) and may be stored in storage apparatus 62 or reintroduced into pipeline 16. The remaining gaseous fuel may be supplied to engine 26 for combustion (step 80). When the gaseous fuel is combusted by engine 26, exhaust may be produced. Heat from the exhaust may be used to run the refrigeration assembly 38 (step 82) to ensure that refrigeration assembly 38 may continue to condition (cool) the gaseous fuel in fuel intake line 30. The cycles of refrigeration and combustion may end (step 84), or may repeat continuously as long as the gaseous fuel is combusted by engine 26.

INDUSTRIAL APPLICABILITY

The disclosed system and method of conditioning fuel may have applicability in engines fueled by gaseous fuels. The system may have particular applicability in a natural gas fueled engine 26 for a pipeline compressor station 18.

Although engine 26 may be designed to operate using unprocessed natural gas as its fuel, processing the natural gas to reduce the amount of impurities in it may help to improve engine performance. Heavy hydrocarbons in unprocessed natural gas may combust at a lower pressure and temperature than processed natural gas. Thus, combustion of the unprocessed natural gas may occur at the lower pressure and temperature at which the heavy hydrocarbons combust, rather than at the higher pressure and temperature at which the processed natural gas may combust. By removing those heavy hydrocarbons with absorption chiller assembly 38, the pressure and temperature at which the natural gas will combust may be increased. This may allow engine 26 to have a higher compression ratio than if it were running on unprocessed natural gas. An increase in the compression ratio of engine 26 may result in more efficient engine timing and/or increased power capabilities, all contributing to improved engine performance. Heavy hydrocarbons have also been known to increase the rate of engine wear, so as an added benefit, the removal of heavy hydrocarbons from the natural gas may help to extend the life of engine 26.

Heat energy may be used to drive the refrigeration cycle of absorption chiller assembly 38. That heat energy may come from waste heat in exhaust generated by combusting the natural gas. Thus, heat that would normally have been expelled into the environment with the exhaust can be used to run absorption chiller assembly 38 and condition the natural gas. As such, fuel conditioning may be achieved efficiently, with little or no additional electrical power.

An added benefit of conditioning natural gas to separate out heavy hydrocarbons is that the heavy hydrocarbons may be salvaged for sale or re-use. For example, the condensed heavy hydrocarbons in storage apparatus 62 may be transferred into barrels, which then may be sold to chemical companies and other customers. Additionally or alternatively, the heavy hydrocarbons may be reintroduced to a main pipeline 16, where it may flow downstream to a customer 20 and/or processing facility.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. An engine assembly comprising:
   an internal combustion engine configured to combust a gaseous fuel;
   a fuel intake line operatively connected to the internal combustion engine, the fuel intake line being configured to direct the gaseous fuel towards the internal combustion engine; and
   a refrigeration assembly, operatively connected to the fuel intake line, that operates using heat from exhaust produced by combustion of the gaseous fuel, the refrigeration assembly being configured to cool the gaseous fuel in the fuel intake line.

2. The engine assembly of claim 1, further including an exhaust assembly, the exhaust assembly being configured to direct exhaust away from the engine.

3. The engine assembly of claim 2, wherein the exhaust assembly is operatively connected to the refrigeration assembly.

4. The engine assembly of claim 3, wherein the refrigeration assembly is an absorption chiller.

5. The engine assembly of claim 1, further including a storage apparatus operatively connected to at least one of the fuel intake line and the refrigeration assembly, the storage apparatus being configured to store condensation formed by cooling the gaseous fuel.

6. A method for improving engine performance, the method comprising:
   diverting a gaseous fuel from a pipeline into a fuel intake line of an engine;
   cooling the gaseous fuel in the fuel intake line to form condensation;
   separating the condensation from the gaseous fuel; and
   supplying the gaseous fuel to the engine for combustion.

7. The method of claim 6, further including cooling the gaseous fuel with an absorption chiller.

8. The method of claim 7, wherein the absorption chiller operates using heat from exhaust produced by combustion of the gaseous fuel in the engine.

9. The method of claim 6, wherein cooling the gaseous fuel causes condensation to form.

10. The method of claim 9, wherein the condensation is stored in a storage apparatus.

11. The method of claim 9, wherein the condensation is directed back into the pipeline at a location downstream from where the gaseous fuel is diverted from the pipeline into the fuel intake line.

12. The method of claim 9, wherein the condensation includes heavy hydrocarbons.

13. A fuel conditioning system comprising:
a refrigeration assembly operatively connected to a fuel intake line of an internal combustion engine, wherein the refrigeration assembly is configured to cool a gaseous fuel flowing through the fuel intake line; and
a separator operatively connected to at least one of the refrigeration assembly and the fuel intake line, wherein the separator is configured to separate the gaseous fuel from condensation formed by cooling the gaseous fuel.

14. The system of claim 13, wherein the refrigeration assembly further includes an absorption chiller, and the absorption chiller has a refrigerant contained therein.

15. The system of claim 14, wherein the refrigerant includes ammonia and water.

16. The system of claim 13, wherein the separator further includes a storage apparatus configured to store the condensation.

17. The system of claim 13, wherein the separator further includes a mixing line configured to direct the condensation into a pipeline.

18. The system of claim 13, wherein the gaseous fuel is diverted from a pipeline into the fuel intake line.

19. The system of claim 13, wherein the refrigeration assembly operates using heat from exhaust produced by combusting the gaseous fuel in the internal combustion engine.

20. The system of claim 13, wherein the condensation includes heavy hydrocarbons.

* * * * *